US012300206B2

(12) United States Patent
Takigawa et al.

(10) Patent No.: US 12,300,206 B2
(45) Date of Patent: May 13, 2025

(54) KEYBOARD APPARATUS AND PROXIMITY SENSOR

(71) Applicant: YAMAHA CORPORATION, Hamamatsu (JP)

(72) Inventors: Soichi Takigawa, Hamamatsu (JP); Yohei Wada, Hamamatsu (JP); Koji Yataka, Hamamatsu (JP); Yoshinari Nakamura, Hamamatsu (JP); Takahiro Asano, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 266 days.

(21) Appl. No.: 18/306,475

(22) Filed: Apr. 25, 2023

(65) Prior Publication Data

US 2023/0267903 A1 Aug. 24, 2023

Related U.S. Application Data

(63) Continuation of application No. PCT/JP2021/039433, filed on Oct. 26, 2021.

(30) Foreign Application Priority Data

Nov. 13, 2020 (JP) ................................ 2020-189405

(51) Int. Cl.
*G10H 1/34* (2006.01)

(52) U.S. Cl.
CPC ....... *G10H 1/344* (2013.01); *G10H 2220/221* (2013.01); *G10H 2220/275* (2013.01)

(58) Field of Classification Search
CPC ............. G10H 1/344; G10H 2220/221; G10H 2220/275
See application file for complete search history.

(56) References Cited

U.S. PATENT DOCUMENTS 3,960,044 A * 6/1976 Nagai .................. G10H 1/0558 84/706
8,115,737 B2 * 2/2012 Oba ...................... G06F 3/0446 345/173
(Continued)

FOREIGN PATENT DOCUMENTS

JP 2000338977 A 12/2000
JP 2008152115 A 7/2008
(Continued)

OTHER PUBLICATIONS

International Search Report issued in Intl. Appln. No. PCT/JP2021/039433 mailed Jan. 18, 2022. English translation provided.
(Continued)

*Primary Examiner* — Robert W Horn
(74) *Attorney, Agent, or Firm* — ROSSI, KIMMS & McDOWELL LLP

(57) ABSTRACT

A keyboard apparatus according to an embodiment includes a keyboard and a mutual capacitance proximity sensor. The keyboard includes a first key and a second key arranged in an array direction with respect to the first key. The proximity sensor includes a first electrode having a portion extending from at least a first area below the first key to a second area below the second key, a second electrode arranged in the first area, and a third electrode arranged in the second area. The proximity sensor is a mutual capacitance type sensor and is configured to use a change in capacitance between the first electrode and the second electrode and a change in capacitance between the first electrode and the third electrode.

17 Claims, 19 Drawing Sheets

(56) References Cited

U.S. PATENT DOCUMENTS

| | | | | |
|---|---|---|---|---|
| 8,284,165 | B2 * | 10/2012 | Koshiyama | G06F 3/0443 345/173 |
| 2008/0141847 | A1 * | 6/2008 | Komatsu | G10H 1/346 84/440 |
| 2008/0245216 | A1 * | 10/2008 | Kojima | G01P 3/50 84/688 |
| 2010/0127989 | A1 | 5/2010 | Oba et al. | |
| 2017/0300166 | A1 | 10/2017 | Rosenberg et al. | |
| 2023/0267903 | A1 * | 8/2023 | Takigawa | G10H 1/344 84/423 R |

FOREIGN PATENT DOCUMENTS

| | | | |
|---|---|---|---|
| JP | 2010128544 | A | 6/2010 |
| JP | 2019512831 | A | 5/2019 |

OTHER PUBLICATIONS

English translation of Written Opinion issued in Intl. Appln. No. PCT/JP2021/039433, mailed Jan. 18, 2022, previously cited in IDS filed Apr. 25, 2023.

* cited by examiner

KEYBOARD APPARATUS AND PROXIMITY SENSOR

CROSS REFERENCE TO RELATED APPLICATIONS

This application is a Continuation of International Patent Application No. PCT/JP2021/039433, filed on Oct. 26, 2021, which claims the benefit of priority to Japanese Patent Application No. 2020-189405, filed on Nov. 13, 2020, the entire contents of which are incorporated herein by reference.

FIELD

The present disclosure relates to a keyboard apparatus.

BACKGROUND

A keyboard apparatus in which a proximity sensor for detecting that a user's finger approaches a key is arranged has been developed (for example, Japanese Laid-Open Patent Publication No. 2008-152115). By detecting that the finger approaches the key, a process of supplying resistance to the key can be prepared before the key is operated.

SUMMARY

A keyboard apparatus according to an embodiment includes a keyboard and a mutual capacitance proximity sensor. The keyboard includes a first key and a second key arranged in an array direction with respect to the first key. The proximity sensor includes a first electrode having a portion extending from at least a first area below the first key to a second area below the second key, a second electrode arranged in the first area, and a third electrode arranged in the second area. The proximity sensor is a mutual capacitance type sensor and is configured to use a change in capacitance between the first electrode and the second electrode and a change in capacitance between the first electrode and the third electrode.

DESCRIPTION OF EMBODIMENTS

Figure 1:
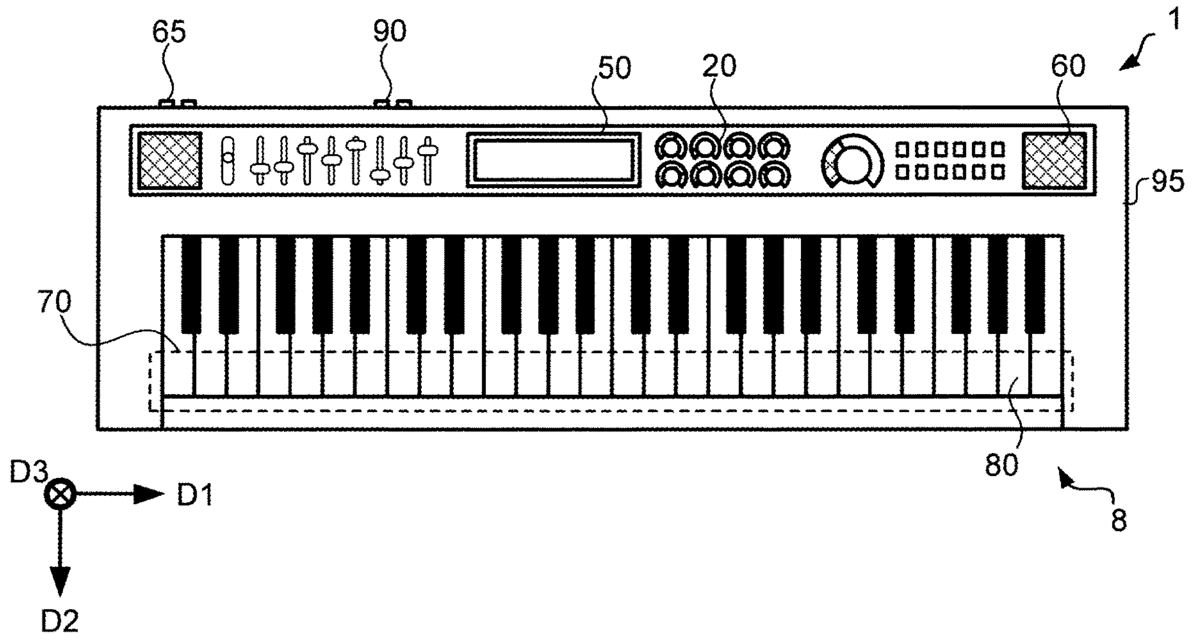
FIG. 1 is a diagram showing an external appearance of an electronic keyboard apparatus according to a first embodiment.

Hereinafter, an electronic keyboard apparatus according to an embodiment of the present disclosure will be described in detail with reference to the drawings. The following embodiments are examples, and the present disclosure should not be interpreted as being limited to these embodiments. In the drawings referred to in the present embodiment, the same or similar parts are denoted by the same reference numerals or similar reference numerals (only denoted by A, B, and the like after the numerals), and repeated description thereof may be omitted. In addition, the dimensional ratios in the drawings may be different from actual ratios for convenience of explanation, or a part of the configuration may be omitted from the drawings.

According to the technique disclosed in Patent Document 1, one or more proximity sensors are used for each key in order to recognize a key as a pushed object to be pressed before the key is pressed. Therefore, it is necessary to arrange the proximity sensors independently according to the number of keys, and it is necessary to adopt a complicated structure for realization.

An object of the present disclosure is to simplify a structure of the proximity sensor arranged in the keyboard apparatus.

First Embodiment

[1. Configuration of Electronic Keyboard Apparatus]

FIG. 1 is a diagram showing an appearance of an electronic keyboard apparatus according to a first embodiment. An electronic keyboard apparatus 1 is a synthesizer including a keyboard 8. The keyboard 8 includes a plurality of keys 80 rotatably supported by a housing 95. The key 80 is formed of an insulating material. The insulating material is, for example, plastic or wood. The electronic keyboard apparatus 1 generates a sound signal in response to an operation of a key by a user or a control by a sequencer. The electronic keyboard apparatus 1 can also change the sound signal in accordance with a detection result by a proximity sensor 70 described later. The sound signal is output from a signal output unit 65 or a speaker 60 arranged in the housing 95. In addition, the electronic keyboard apparatus 1 includes an operation unit 20, a display unit 50, and an interface 90 arranged in the housing 95.

Here, as a plurality of directions with respect to the keyboard apparatus 1, a first direction D1, a second direction D2, and a third direction D3 are defined as shown in FIG. 1. The first direction D1 corresponds to an array direction of the keys 80 (a direction from a bass side to a treble side). The second direction D2 corresponds to a longitudinal direction of the key 80 (a direction from a center of rotation of the key 80 to a tip of the key 80). The second direction D2 can also be referred to as a direction from a back side to a front side of the keyboard apparatus 1. The third direction D3 corresponds to a lower direction in the case where the keyboard apparatus 1 is installed in a playing condition. The first direction D1, the second direction D2, and the third direction D3 are perpendicular to each other. These directions have the same relationship as FIG. 1 in the other drawings.

Figure 2:
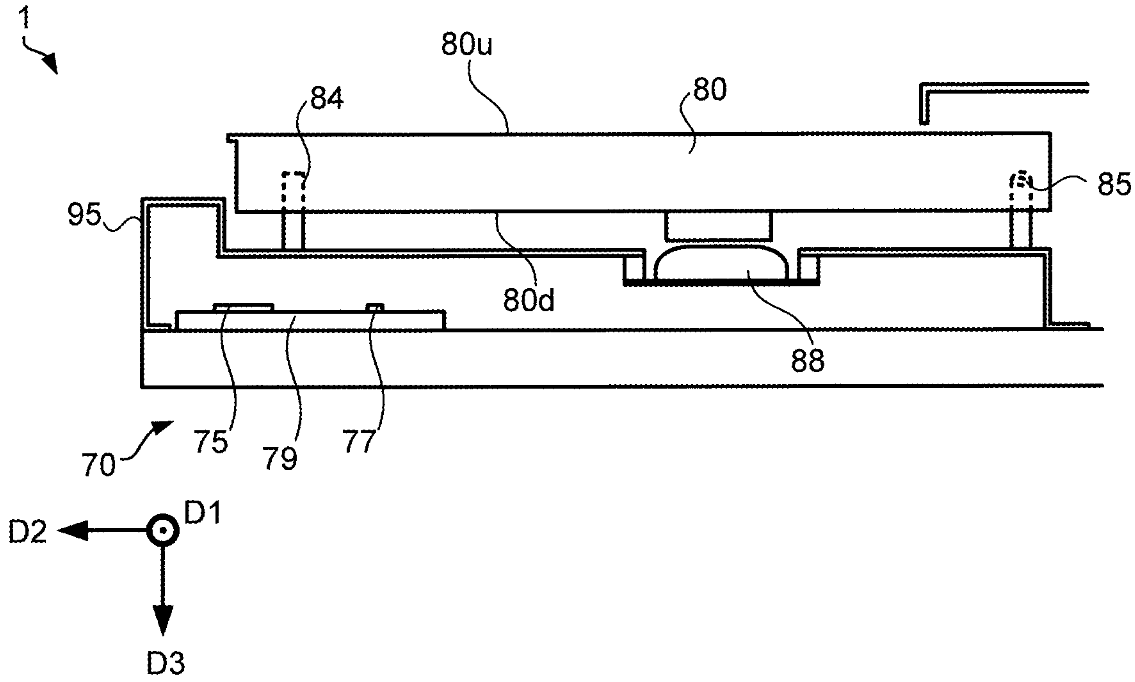
FIG. 2 is a diagram showing a positional relationship between a transmitting electrode and a receiving electrode of a proximity sensor in the first embodiment (in the case where the proximity sensor is viewed from a side direction of the keyboard apparatus).

FIG. 2 is a diagram showing a positional relationship between a transmitting electrode and a receiving electrode of the proximity sensor according to the first embodiment (in the case where the proximity sensor is viewed from a side direction of the keyboard apparatus). Before describing this positional relationship, first, a configuration other than the proximity sensor 70 will be described. A shaft 85 rotatably supports the key 80 with respect to the housing 95. A guide portion 84 restricts a rotation range and a rotation direction of the key 80. The key 80 is subjected to an upward force by a weight, a spring, or the like (not shown). A keystroke detection unit 88 is a sensor that detects a process in which the key 80 moves from the rest position toward the end position in response to a pressing operation with respect to the key 80, and is arranged on a lower surface **80*d* side of the key 80** in this embodiment.

The proximity sensor 70 is held by the housing 95 below the key 80. The proximity sensor 70 is an electrostatic capacitance sensor which is a mutual capacitance type, and includes a transmitting electrode 75 and a receiving electrode 77 arranged on a support substrate 79 such as a printed circuit board. In this embodiment, the transmitting electrode 75 is spaced apart from the receiving electrode 77 in the second direction D2, but a positional relationship between the transmitting electrode 75 and the receiving electrode 77 may be reversed. Here, a positional relationship between the key 80 and the proximity sensor 70 will be further described with reference to FIG. 3 and FIG. 4.

[2. Example of Electrode Arrangement of Proximity Sensor]

Figure 3:
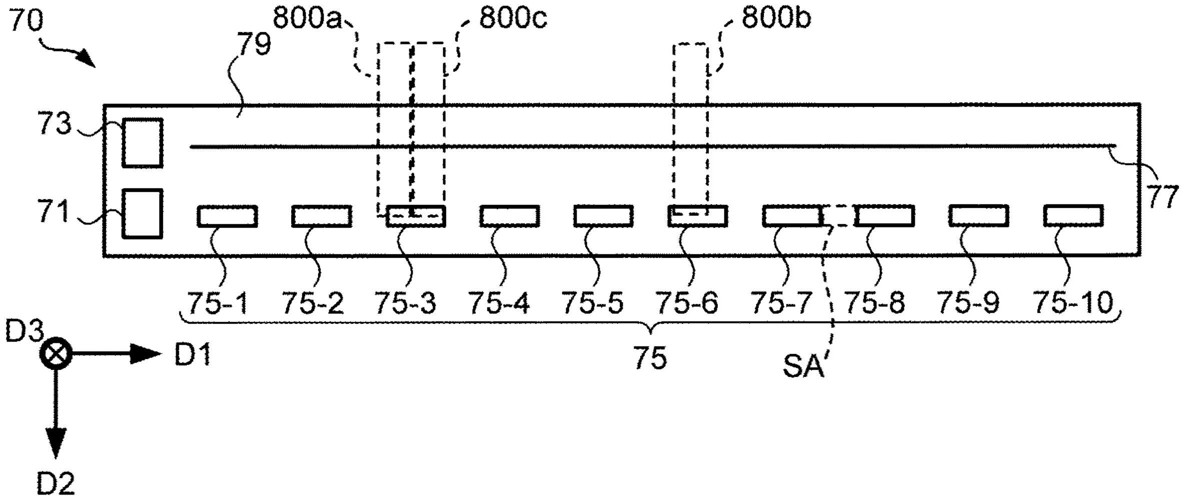
FIG. 3 is a diagram showing the positional relationship between the transmitting electrode and the receiving electrode in the first embodiment (in the case where the proximity sensor is viewed from an upper direction of the keyboard apparatus).
Figure 4:
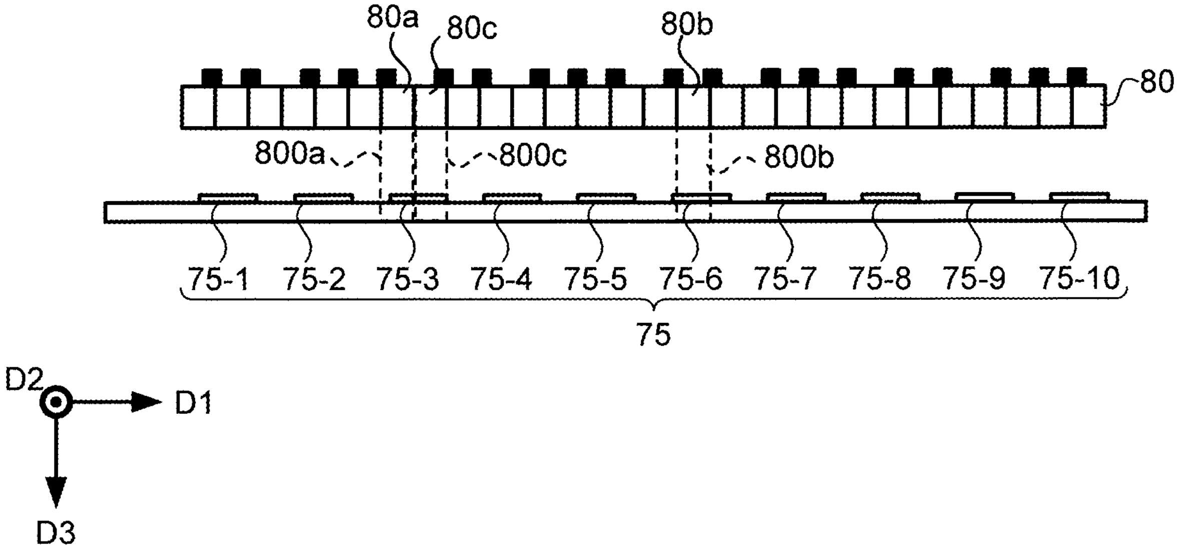
FIG. 4 is a diagram showing the positional relationship between the transmitting electrode and the receiving electrode in the first embodiment (in the case where the proximity sensor is viewed from a front direction of the keyboard apparatus).

FIG. 3 is a diagram showing the positional relationship between the transmitting electrode and the receiving electrode in the first embodiment (in the case where the proximity sensor is viewed from an upper direction of the keyboard apparatus). FIG. 4 is a diagram showing the positional relationship between the transmitting electrode and the receiving electrode in the first embodiment (in the case where the proximity sensor is viewed from a front direction of the keyboard apparatus). In FIG. 3 and FIG. 4, an area **800*a* (first area), an area 800*b* (second area), and an area 800*c* (third area) are areas corresponding to lower portions of a key 80*a* (first key), a key 80*b* (second key), and a key 80*c*** (third key), respectively, which are specified for the following explanation.

As shown in FIG. 3, the areas **800*a*, 800*b*, and 800*c* may be defined as areas directly below the keys 80*a*, 80*b*, and 80*c*, or may be defined as areas extending along the second direction D2 (the longitudinal direction of the key 80). According to the definition extending along the second direction D2, the areas 800*a*, 800*b*, and 800*c* include an area outside the area directly below the keys 80 with respect to directions other than the first direction D1. Whichever definition is adopted, the position of the areas 800*a*, 800*b*, and 800*c* do not change in the case where the proximity sensor 70 is viewed in a direction shown in FIG. 4**.

The key **80*a* and the key 80*c* are adjacent. The positional relationship between the key 80*a* and the key 80*c* may be reversed. That is, either the key 80*a* or the key 80*c* may be arranged at a position close to the key 80*b*. The key 80*b* may be adjacent to the key 80*a* or the key 80*c*, or may not be adjacent to either the key 80*a* or the key 80*c*, as in this instance. Each of the keys 80*a*, 80*b*, and 80*c*** is a white key, but a black key may be included.

As shown in FIG. 3, a drive unit 71, a detection unit 73, a plurality of transmitting electrodes 75, and one receiving electrode 77 are arranged on the support substrate 79. The overall configuration of the proximity sensor 70 will be described later. Here, the positional relationship between the transmitting electrode 75 and the receiving electrode 77 will be described. In this embodiment, transmitting electrodes 75-1, 75-2, . . . , and 75-10 are arranged side by side in the first direction D1 on the support substrate 79. In the following description, each of the transmitting electrodes 75-1, 75-2, . . . , and 75-10 is referred to as the transmitting electrode 75 unless otherwise distinguished. In this embodiment, the transmitting electrode 75 is a rectangular electrode having a long side along the first direction D1 and a short side along the second direction D2. The transmitting electrode 75 and the receiving electrode 77 described below can be applied to various shapes within a range in which the positional relationship between the transmitting electrode 75 and the receiving electrode 77 satisfies the following conditions.

The plurality of transmitting electrodes 75 include at least the transmitting electrode 75-3 (second electrode) arranged in the area **800*a* and the transmitting electrode 75-6 (third electrode) arranged in the area 800*b*. In this embodiment, the transmitting electrode 75-3 also includes a part arranged in the area 800*c*. Therefore, the transmitting electrode 75-3 includes a part extending from the area 800*c* to the area 800*a***.

In this example, the receiving electrode 77 (first electrode) is a linear electrode extending along the first direction D1 and has at least a part extending from the area **800*a* to the area 800*b*. The receiving electrode 77 may also be referred to as a rectangular shape having a long side along the first direction D1 and a short side along the second direction D2. In this example, the direction in which the receiving electrode 77 extends and the direction in which the plurality of transmitting electrodes 75** are arranged are parallel to each other, but may not be parallel to each other.

In the case where the proximity sensor 70 is viewed in the direction shown in FIG. 3 (in the case where the proximity sensor 70 is viewed along the third direction D3), the receiving electrode 77 and the transmitting electrode 75 do not intersect with each other. In this example, the receiving electrode 77 further does not intersect an area connecting the plurality of transmitting electrodes 75. In other words, the receiving electrode 77 is not arranged in an area SA between the adjacent transmitting electrodes 75. In FIG. 3, the area between the transmitting electrode 75-7 and the transmitting electrode 75-8 is shown as an example of the area SA. As shown in this embodiment, the area SA corresponds to an area that fills a space between the transmitting electrode 75-7 and the transmitting electrode 75-8. Areas between the other adjacent transmitting electrodes 75 also correspond to the area SA.

The proximity sensor 70 functions as an electrostatic capacitance sensor which is a mutual capacitance type that detects a change in capacitance between the transmitting electrode 75 and the receiving electrode 77. A range in which the proximity sensor 70 detects an object includes at least a space above an upper surface 80*u* of the key 80, and may include a space existing in the second direction D2 with respect to the space (a space between the player and the key 80).

The proximity sensor 70 has a configuration in which the receiving electrode 77 and the transmitting electrode 75 do not intersect each other. Therefore, a detection characteristic of the object can be adjusted by adjusting a distance between the transmitting electrode 75 and the receiving electrode 77. For example, the range in which the proximity sensor 70 detects the object can be increased further upward by increasing the distance between the transmitting electrode 75 and the receiving electrode 77. On the other hand, a sensitivity of the proximity sensor 70 to detect the object decreases in an area close to the key 80 by increasing this distance.

The proximity sensor 70 has a configuration in which the receiving electrode 77 and the transmitting electrode 75 do not intersect each other. According to such the configuration, for example, in the case where a drive signal DS is supplied to the transmitting electrode 75-1, a highly sensitive area for detecting an object is formed in an area extending perpendicularly to a plane formed between the receiving electrode 77 and the transmitting electrode 75-1 (detection area). As a result, a crosstalk (voltage change due to an object outside the detection area) at a time of detection is unlikely to occur, and thus it is possible to prevent an object from being detected at a position corresponding to the transmitting electrode 75 to which the drive signal DS is not supplied.

[3. Configuration of Electronic Keyboard Apparatus]

Next, an overall configuration of the electronic keyboard apparatus 1 will be described.

Figure 5:
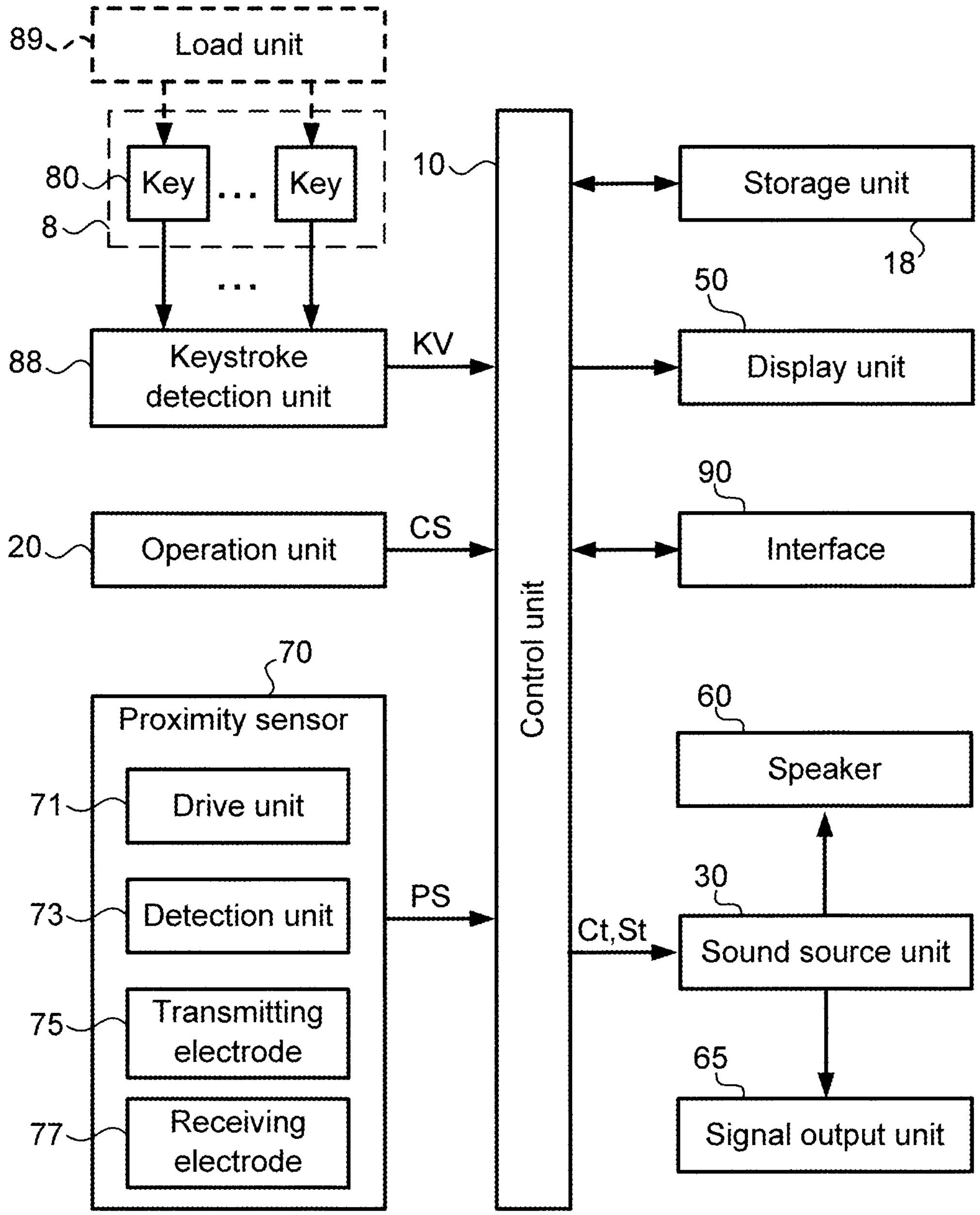
FIG. 5 is a diagram showing a configuration of the electronic keyboard apparatus according to the first embodiment.

FIG. 5 is a diagram showing a configuration of the electronic keyboard apparatus according to the first embodiment. The electronic keyboard apparatus 1 includes a control unit 10, a storage unit 18, the operation unit 20, a sound source unit 30, the display unit 50, the speaker 60, the signal output unit 65, the proximity sensor 70, the key 80, the keystroke detection unit 88, and the interface 90.

The storage unit 18 is a storage device such as a non-volatile memory, and includes an area for storing a control program executed by the control unit 10. The control program may be provided from an external device. When the control program is executed by the control unit 10, various functions are realized in the electronic keyboard apparatus 1. One of the functions realized is a function for controlling the sound generation content of the sound source unit 30 based on the detection result detected by the proximity sensor 70.

The operation unit 20 includes an operation device such as a knob, a slider, a touch sensor, and a button, and receives an instruction from the user to the electronic keyboard apparatus 1. The operation unit 20 outputs an operation signal CS corresponding to the received user's instruction to the control unit 10.

The display unit 50 includes a display device such as a liquid crystal display, and displays various screens under the control of the control unit 10. A touch panel may be configured by combining the touch sensor with the display unit 50.

The speaker 60 generates a sound corresponding to the sound signal by amplifying and outputting the sound signal supplied from the sound source unit 30.

The signal output unit 65 includes a terminal for outputting a sound signal supplied from the sound source unit 30 to an external device.

The proximity sensor 70 detects an object such as a hand and a finger of a user close to the key 80, and outputs a detection signal PS corresponding to a position of the detected object to the control unit 10. The proximity sensor 70 includes the drive unit 71, the detection unit 73, the transmitting electrode 75, and the receiving electrode 77. A detailed configuration of the proximity sensor 70 will be described later.

The keystroke detection unit 88 includes a sensor for outputting a keystroke signal KV corresponding to a position of the depressed key 80 and depressed amount of the key 80 to the control unit 10.

In this example, the interface 90 includes a terminal for connecting an external device such as a controller to the electronic keyboard apparatus 1. The interface 90 may include a terminal for transmitting and receiving MIDI data.

The control unit 10 is an example of a computer including an arithmetic processing circuit such as a CPU and a storage device such as a RAM and a ROM. The control unit 10 executes the control program stored in the storage unit 18 by the CPU, and implements various functions in the electronic keyboard apparatus 1 in accordance with the instruction described in the control program. For example, the control unit 10 generates a sound source control signal Ct based on the keystroke signal KV, and generates a setting signal St based on the detection signal PS and the operation signal CS.

The sound source control signal Ct includes information for controlling the generation of sounds such as a note number, a note-on, and a note-off, and is used to generate a sound signal in the sound source unit 30. The setting signal St is used to set various parameters required for generating a sound signal in the sound source unit 30. The various parameters include parameters for setting a timbre, a sound effect, and the like. The method of controlling the sound source unit 30 by the setting signal St based on the detection signal PS (sound source control method) will be described later.

The sound source unit 30 includes a DSP (Digital Signal Processor). The sound source unit 30 generates a sound signal based on the sound source control signal Ct and the setting signal St supplied from the control unit 10. The sound source unit 30 may supply the generated sound signal to the signal output unit 65, and may further supply the sound signal to the speaker 60. The sound source unit 30 implements various functions according to instructions described in a predetermined program. This program may be provided from an external device. All or some of the functions implemented in the sound source unit 30 may be implemented by executing a program in the control unit 10. Conversely, all or some of the functions implemented in the control unit 10 may be implemented by executing a program in the sound source unit 30.

[4. Proximity Sensor Configuration]

Next, the configuration of the proximity sensor 70 will be described.

Figure 6:
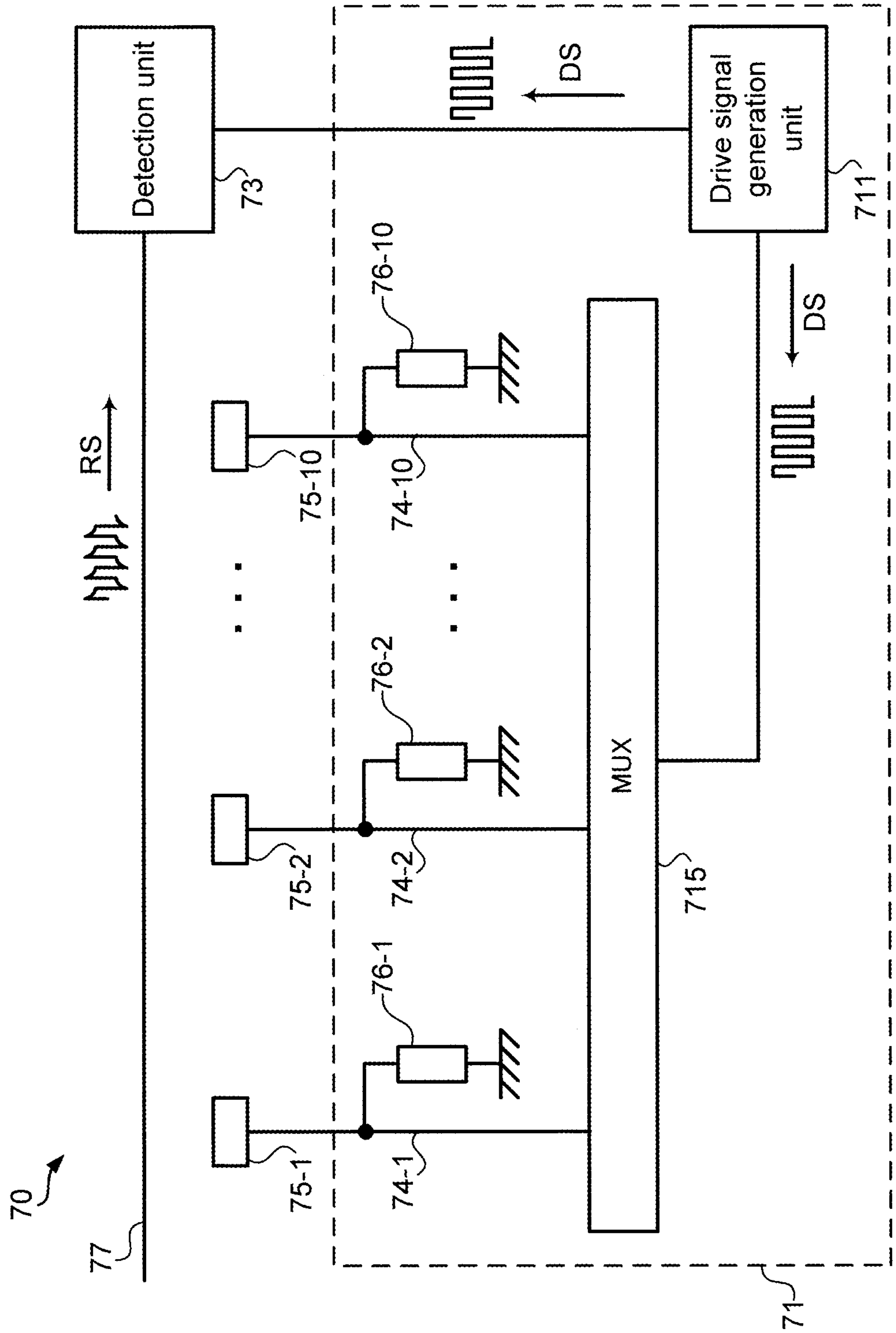
FIG. 6 is a diagram showing a configuration of the proximity sensor according to the first embodiment.

FIG. 6 is a diagram showing a configuration of the proximity sensor according to the first embodiment. The drive unit 71 includes a drive signal generation unit 711, multiplexers (MUX) 715, wirings 74 (74-1, 74-2, . . . , and 74-10), and ground resistances 76 (76-1, 76-2, . . . , and 76-10). The driving unit 7 supplies the drive signal DS to the transmitting electrode 75 according to these configurations. The drive signal DS is a pulse signal in this case.

The wirings 74-1, 74-2, . . . , and 74-10 are connected to the transmitting electrodes 75-1, 75-2, . . . , and 75-10, respectively. The wirings 74-1, 74-2, . . . , and 74-10 are connected to the ground resistances 76-1, 76-2, . . . , and 76-10, respectively.

The drive signal generation unit 711 generates the drive signal DS and outputs it to the multiplexer 715. The multiplexer 715 repeatedly connects the drive signal generation unit 711 to the wirings 74-1, 74-2, . . . , and 74-10 in sequence. As a result, the drive signal DS is sequentially supplied to the transmitting electrodes 75-1, 75-2, . . . , and 75-10. In other words, periods in which the drive signal DS is supplied to the transmitting electrodes 75 differ from each other. For example, the drive signal DS is supplied to the transmitting electrode 75-1 in a first period, and is supplied to the transmitting electrode 75-2 in a second period following the first period. A time of one cycle until the drive signal DS is supplied to all of the transmitting electrodes 75 may be, for example, about 1 ms to 100 ms. In the case where 10 transmitting electrodes 75 are provided as described in this embodiment, a period in which the drive signals DS are supplied to the transmitting electrodes 75 are about 0.1 ms to 10 ms.

When the number of the transmitting electrodes 75 is reduced, the following phenomena occur in the case where a period in which the drive signal DS is supplied to the transmitting electrodes 75 is not changed. The time of one cycle is shortened, and a time accuracy of an object detection is increased. On the other hand, an arrangement density of the transmitting electrodes 75 becomes low, and a positional accuracy of the object detection becomes low. On the contrary, if the number of the transmitting electrodes 75 are increased, the opposite phenomena occur. That is, the time of one cycle becomes longer and the time accuracy of the object detection becomes lower, while the arrangement density of the transmitting electrodes 75 becomes higher and the positional accuracy of the object detection becomes higher.

The wiring that is not connected to the drive signal generation unit 711 is grounded via the ground resistance 76, so that the transmitting electrode 75 to which the drive signal DS is not supplied is fixed to a ground potential (fixed potential).

The receiving electrode 77 receives the drive signal DS transmitted from the transmitting electrode 75 by capacitive coupling with the transmitting electrode 75. In this case, the drive signal DS is modulated by changing the capacitance between the receiving electrode 77 and the transmitting electrode 75 by an object (such as a hand of the user) approaching the key 80. As a result of this modulation, a waveform of a reception signal RS received by the receiving electrode 77 is changed. The larger the change of the waveform caused by the modulation, the closer the object is to the transmitting electrode 75 to which the drive signal DS was supplied in this case. The detection unit 73 acquires the reception signal RS and outputs a signal corresponding to the signal waveform.

As described above, since the key 80 is formed of an insulating material, the key 80 does not change the electrostatic capacitance between the transmitting electrode 75 and the receiving electrode 77. Therefore, the proximity sensor 70 is less susceptible to the influence of the key 80 when the proximity sensor 70 detects an object. In the case where the key 80 is provided with a metal such as a weight, the metal is preferably kept in an electrically floating state by being held by an insulating material. In a range in which the proximity sensor 70 can detect an object, it is preferable that there is no structure formed of a metal other than the proximity sensor 70. In the case where a structure made of metal is present, it is preferable that the structure is held by an insulating material and is in an electrically floating state. In the case where it is not electrically floating, or in the case where it affects the reception signal RS even if it is electrically floating, the state of the affected reception signal RS may be defined as a background state in object detection.

Figure 7:
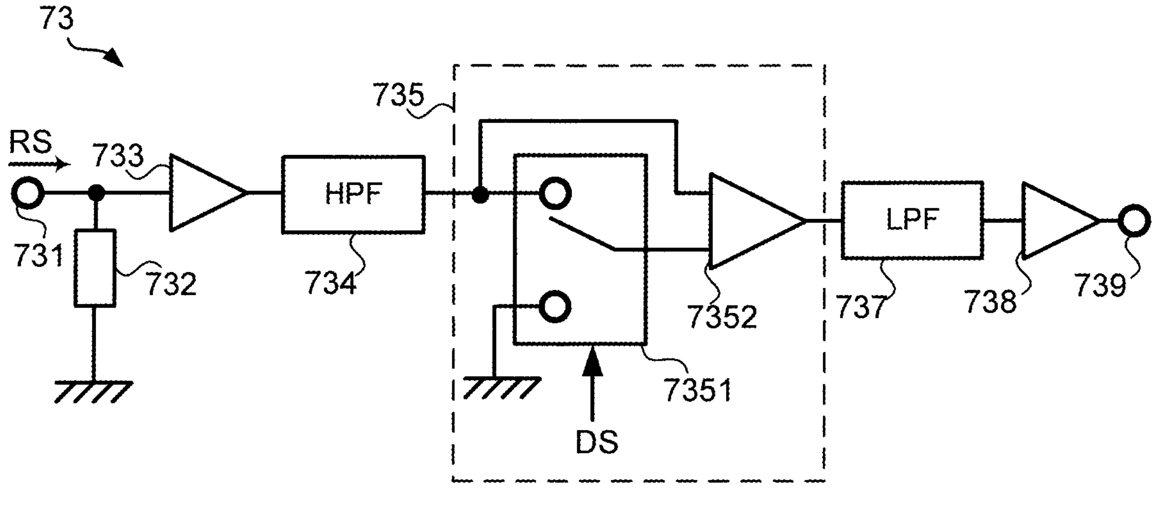
FIG. 7 is a diagram showing a configuration of a detection unit according to the first embodiment.

FIG. 7 is a diagram showing a configuration of the detection unit according to the first embodiment. As shown in FIG. 7, the detection unit 73 includes an input terminal 731, a ground resistance 732, an amplifier 733, a high pass filter (HPF) 734, a synchronous detection circuit 735, a low pass filter (LPF) 737, an amplifier 738, and an output terminal 739. The high pass filter 734 removes low-frequency components other than a frequency of the drive signal DS.

The synchronous detection circuit 735 includes a synchronous switch 7351 and a comparator 7352. The synchronous switch 7351 switches between a state supplying a signal from the high pass filter 734 to both input terminals of the comparator 7352 or a state supplying a ground potential to one of the input terminals in synchronization with the drive signal DS. The low pass filter 737 removes components corresponding to the frequency of the drive signal DS. The signal output from the output terminal 739 is an output-level signal corresponding to a difference between the drive signal DS and the reception signal RS, that is, a modulation quantity due to a capacitance change.

The detection signal PS output by the proximity sensor 70 to the control unit includes information in which a relationship between a level of an output signal from the output terminal 739 and a position of the transmitting electrode 75 to which the drive signal DS is supplied is correlated. Accordingly, the detection signal PS includes information indicating a distance between the key 80 and the object in each of the positions of the plurality of transmitting electrodes 75. The configuration of the proximity sensor 70 has been described above.

[5. Sound Source Control Method]

Next, sound source control methods executed based on the detection signal PS output from the proximity sensor 70 will be described. For example, if an instruction to execute a process using the detection signal PS is input from the operating unit 20, the following sound source control method is executed.

Figure 8:
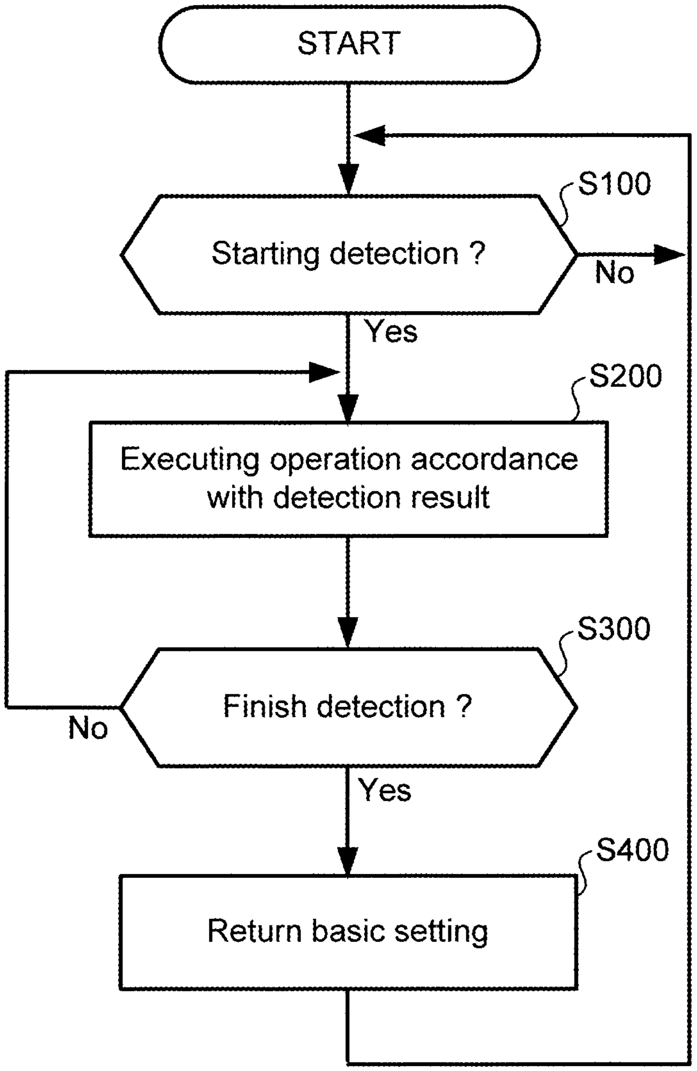
FIG. 8 is a flowchart showing a sound source control method according to the first embodiment.

FIG. 8 is a flowchart showing a sound source control method according to the first embodiment. First, the control unit 10 refers to the detection signal PS and waits until an object is detected by the proximity sensor 70 (step S100; No). The control unit 10 refers to the detection signal PS, and determines that an object has been detected if a level of the output signal corresponding to any of the transmitting electrodes 75 exceeds a predetermined level. When an object is detected by the proximity sensor 70 (step S100; Yes), a process corresponding to the detection result is executed based on the detection signal PS (step S200). The control unit 10 continues this process until no object is detected by the proximity sensor 70 (step S300; No, S200). When no object is detected by the proximity sensor 70 (step S300; Yes), the content set in the step S200 is discarded and returned to the basic setting (step S400), and the control unit 10 waits until an object is detected by the proximity sensor 70 again (step S100; No).

The process executed in the step S200 may vary depending on the content set in the sound source unit 30 when the sound source control method is executed. For example, a situation is assumed in which the control unit 10 has previously set a split function in the sound source unit 30 by the setting signal St. The split function is a function of dividing the plurality of keys 80 into a bass range (first key range) and a treble range (second key range), and of causing the first timbre set to the bass range and the second timbre set to the treble range to be pronounced.

The control unit 10 controls the sound source unit 30 by generating the setting signal St in accordance with the detection signal PS and outputting it to the sound source unit 30. In this embodiment, the control unit 10 determines a border that separates the bass range and the treble range based on the detection signal PS. The control unit 10 outputs the setting signal St including key range information indicating the bass range and the treble range to the sound source unit 30 based on the determined border. As a method of determining the boundary, a known method such as blob analysis or edge detection may be used, and for example, the following methods can be used.

The control unit 10 refers to the detection signal PS, extracts output signal levels corresponding to the plurality of transmitting electrodes 75, and associates the output signal levels with respective coordinates indicating positions along the first direction D1. This coordinate may correspond to a position of the key 80. An output signal level corresponding to the transmitting electrode 75 is associated with a coordinate corresponding to the transmitting electrode 75. On the other hand, a level interpolated by using an output signal level corresponding to each of the adjacent transmitting electrodes 75 is associated with a coordinate corresponding to a position where the transmitting electrode 75 is not present.

The control unit 10 binarizes a predetermined threshold level as a reference to specify coordinates exceeding the threshold level (hereinafter, referred to as object detection coordinates). In the case where the object detection coordinates of a predetermined number (first detection number) or more are continuously present, the control unit 10 determines that a hand is present in the range of the coordinates. In the control unit 10, the range in which the object detection coordinates are continuously present is separated into two ranges in the case where an object is detected at the positions of the plurality of transmitting electrodes 75 and no object is detected at the transmitting electrodes 75 arranged between these positions (or in the case where the level of detection is relatively low). Therefore, it is recognized that two objects separated from each other are being detected. The two objects are actually assumed to be the right and left hands of the user. At this time, the control unit 10 divides the bass range and the treble range by using the key 80 corresponding to the center of the positions where no object is detected between the two objects (or the position of the midpoint of the center coordinates of each of the two objects) as the boundary. The boundary key 80 may be the key 80 corresponding to the highest timbre in the bass range or the key 80 corresponding to the lowest timbre in the treble range.

Two objects may be detected as one object, such as the case where both hands are close to each other. That is, in some cases, although two objects exist, the range in which the object detection coordinates exist continuously is recognized as one range without being separated into two ranges. In the case where both hands are detected in one range as described above, the detected range is wider than a detected range in the case where one hand is detected. Therefore, even in a case where there is only one range in which the object detection coordinates exist continuously, in a case where the range is larger than the predetermined range, it may be determined that there are two objects (both hands). The case that the range is larger than the predetermined range corresponds to a case where the object detection coordinates of a predetermined second detection number larger than the first detection number are continuously present. In this case, the control unit 10 divides the bass range and the treble range by using the key 80 corresponding to the center in one range as the boundary.

While the process of step S200 continues, the control unit 10 continues to set the division between the bass range and the treble range in accordance with the detection signal PS. As a result, the key 80 positioned between the right hand and the left hand can be set as the boundary that separates the bass range and the treble range by following the movement of the right hand and the left hand of the user recognized as two objects.

The proximity sensor 70 in the electronic keyboard apparatus 1 described above constitutes the electrostatic capacitance sensor which is a mutual capacitance type by using the receiving electrode 77 and the plurality of transmitting electrodes 75 arranged below the key 80. It is possible to provide a simple configuration in which the receiving electrode 77 of the sensor is arranged across an area corresponding to the plurality of keys 80 by being arranged below the key 80.

Second Embodiment

When the proximity sensor 70 is viewed along the third direction D3, the transmitting electrode 75 and the receiving electrode 77 do not intersect each other in the first embodiment. In the second embodiment, a proximity sensor 70A having a transmitting electrode 75A and a receiving electrode 77A that are arranged crossing each other will be described.

Figure 9:
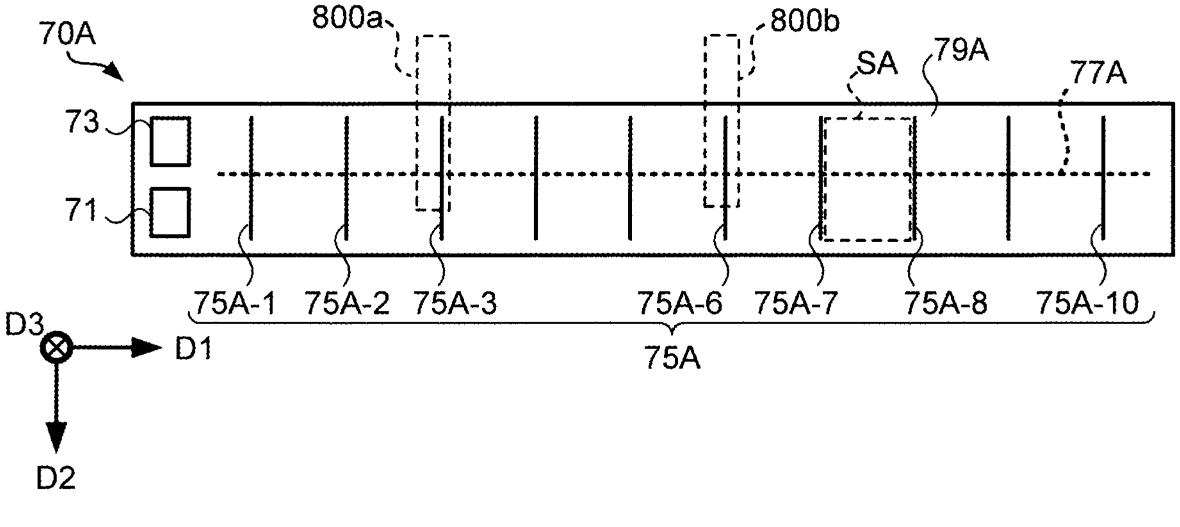
FIG. 9 is a diagram showing a positional relationship between a transmitting electrode and a receiving electrode in a second embodiment (in the case where a proximity sensor is viewed from an upper direction of a keyboard apparatus).

FIG. 9 is a diagram showing a positional relationship between the transmitting electrode and the receiving electrode in the second embodiment (in the case where the proximity sensor is viewed from the upper direction of the keyboard apparatus). The proximity sensor 70A comprises a plurality of transmitting electrodes 75A (75A-1, 75A-2, . . . , and 75A-10) extending along the second direction D2. The plurality of transmitting electrodes 75A are arranged side by side in the first direction D1. Also in this embodiment, the plurality of transmitting electrodes 75A includes a transmitting electrode 75A-3 arranged in the area 800*a* and a transmitting electrode 75A-6 arranged in the area 800*b*.

The receiving electrode 77A is also one electrode extending along the first direction D1 in the same manner as the receiving electrode 77 of the first embodiment.

On the other hand, the receiving electrode 77A is arranged on a surface (lower surface) opposite to the surface (upper surface) on which the transmitting electrode 75A is arranged of both surfaces of the support substrate 79A. In the case where the proximity sensor 70 is viewed in the orientation shown in FIG. 9 (in the case where the proximity sensor 70A is viewed along the third direction D3), the receiving electrode 77A passes through an area SA between the adjacent transmitting electrodes 75A. In FIG. 9, an area between the transmitting electrode 75A-7 and the transmitting electrode 75A-8 is shown as an example of the area SA similar to the first embodiment.

Figure 10:
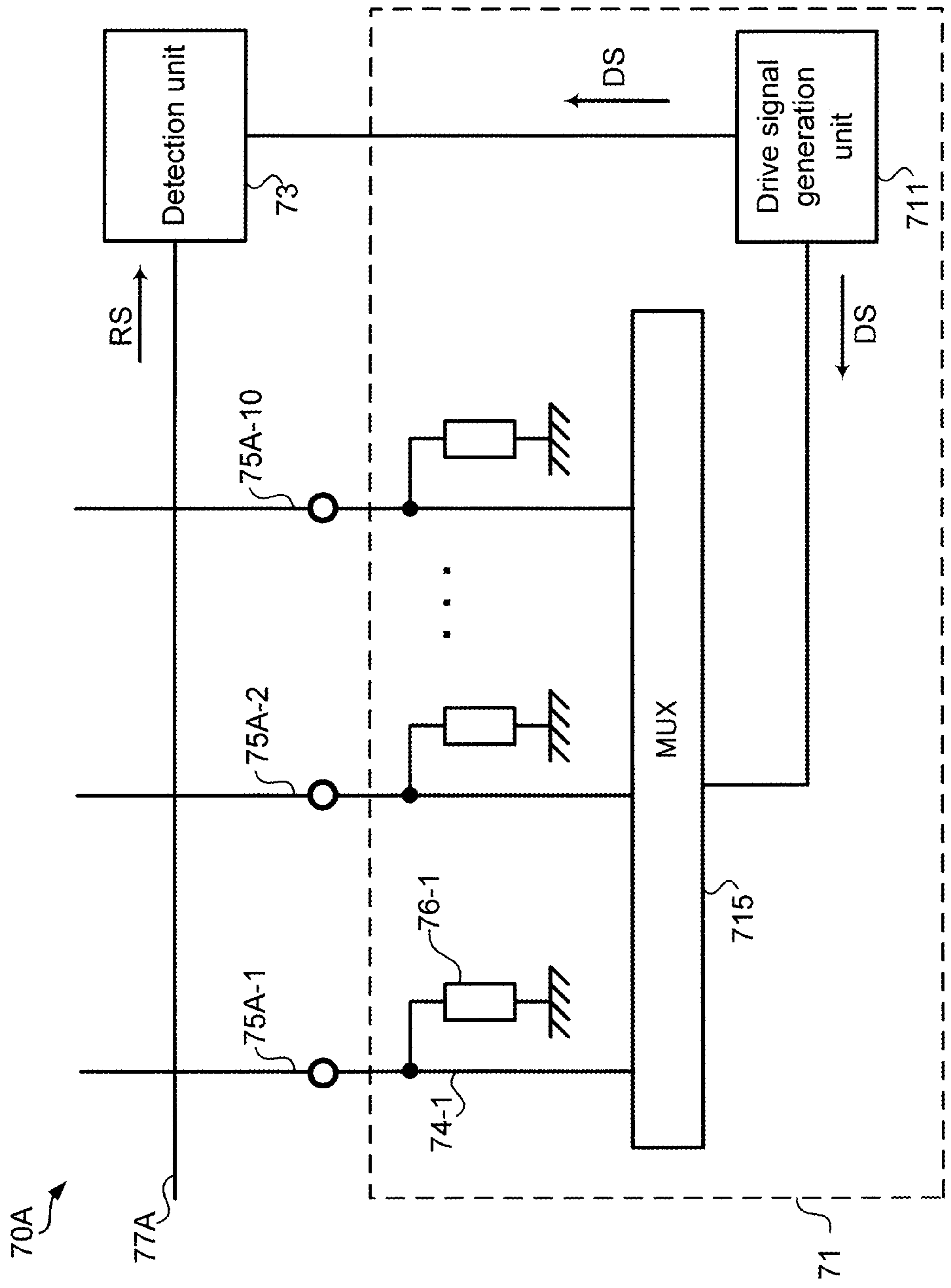
FIG. 10 is a diagram showing a configuration of the proximity sensor according to the second embodiment.

FIG. 10 is a diagram showing a configuration of a proximity sensor according to the second embodiment. The proximity sensor 70A differs from the proximity sensor 70 according to the first embodiment only in the configuration of the electrodes. That is, since the proximity sensor 70A is the same as the proximity sensor 70 except that the wirings 74-1, 74-2, . . . , and 74-10 are connected to the transmitting electrodes 75A-1, 75A-2, . . . , and 75A-10, a detailed explanation thereof will be omitted.

As described above, various arrangements can be applied to the transmitting electrode and the receiving electrode constituting the proximity sensor as long as the positional relationship can form a capacitance. In particular, as in the case of the proximity sensor 70A, since the transmitting electrode 75A and the receiving electrode 77A intersect each other, it is possible to reduce the distance between the transmitting electrode 75A and the receiving electrode 77A. As a result, although the range in which the object is detected is limited to a vicinity of the key 80, the sensitivity in which the object is detected in the range can be increased.

Third Embodiment

Some of the transmitting electrodes used in the proximity sensor may be switched such that the drive signal DS is not supplied depending on the application. In a third embodiment, in the proximity sensor 70A according to the second embodiment, a proximity sensor 70B in which the drive signal DS is not supplied to some of the transmitting electrodes 75A will be described.

Figure 11:
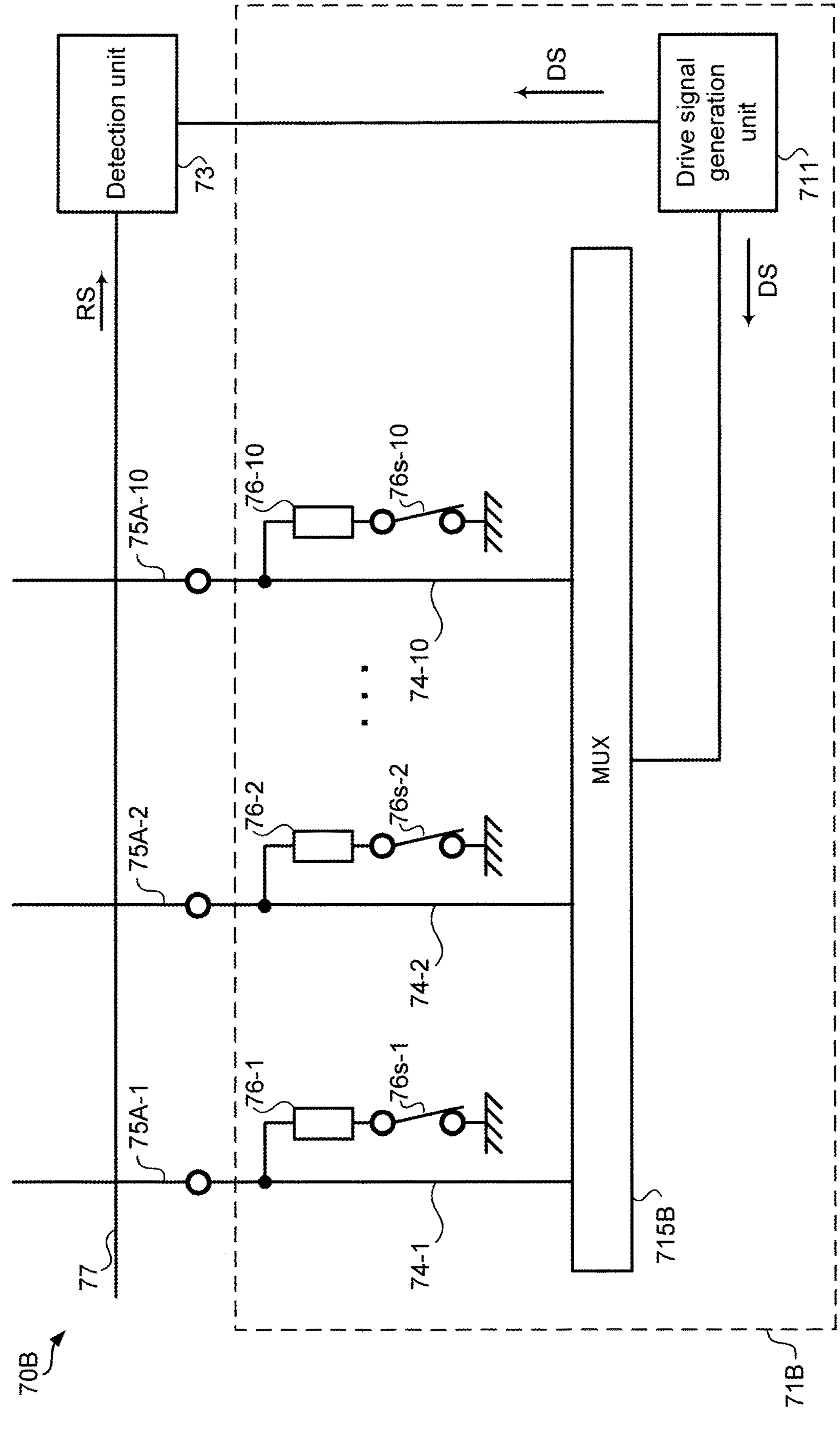
FIG. 11 is a diagram showing a configuration of a proximity sensor according to a third embodiment.

FIG. 11 is a diagram showing a configuration of a proximity sensor according to the third embodiment. The proximity sensor 70B includes switches (switching units) 76*s* (76*s*-1, 76*s*-2, . . . , and 76*s*-10) that disconnect the ground resistance 76 connected to each of the plurality of transmitting electrodes 75A from the ground potential. In the case where all the switches 76*s* are in a conductive state, the transmitting electrodes 75A are connected to the ground potential, and have the same configuration as that of the proximity sensor 70A of the second embodiment. On the other hand, in the case where the position accuracy related to the first direction D1 is not required, some of the transmitting electrodes 75A may be disabled.

In this case, a multiplexer 715B prevents the disabled transmitting electrode 75A from being supplied with the drive signal DS, and switches the switches 76*s* connected to the transmitting electrode 75A to which the drive signal DS is not supplied from the conductive state to the non-conductive state. In this way, the transmitting electrode 75A is turned into a floating state by disconnecting the transmitting electrode 75A with the ground potential, so that it can be brought close to an environment in which the disabled transmitting electrode is not present in an object detection in the proximity sensor 70B.

Figure 12:
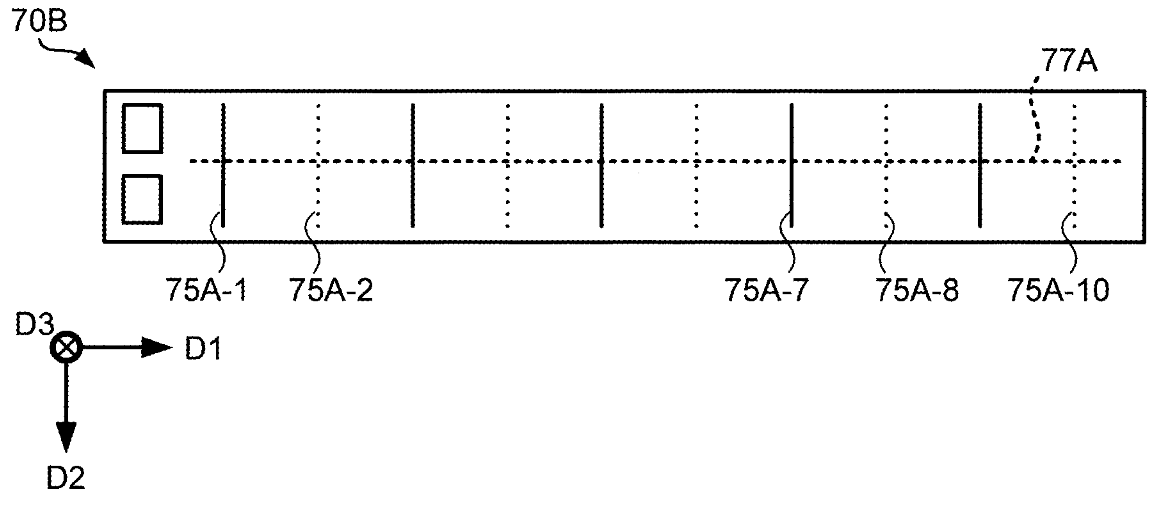
FIG. 12 is a diagram showing an example of the use of the proximity sensor in the third embodiment.

FIG. 12 is a diagram showing an example of the use of the proximity sensor according to the third embodiment. As shown in FIG. 12, since the transmitting electrodes 75A-2, 75A-4, 75A-6, 75A-8, and 75A-10 are disabled so that half of the transmitting electrodes 75A are not present, the position accuracy of the object is halved. If the supply time of the drive signal DS to the respective transmitting electrode 75A is not changed, the subsequent drive signal DS can be supplied in half the time, so that the time accuracy of the object detection can be doubled.

Fourth Embodiment

The number of receiving electrodes in the proximity sensor is not limited to one. In a fourth embodiment, a proximity sensor 70C having two receiving electrodes 77C (77C-1 and 77C-2) will be described. The receiving electrodes 77C are not limited to two, and may be three or more.

Figure 13:
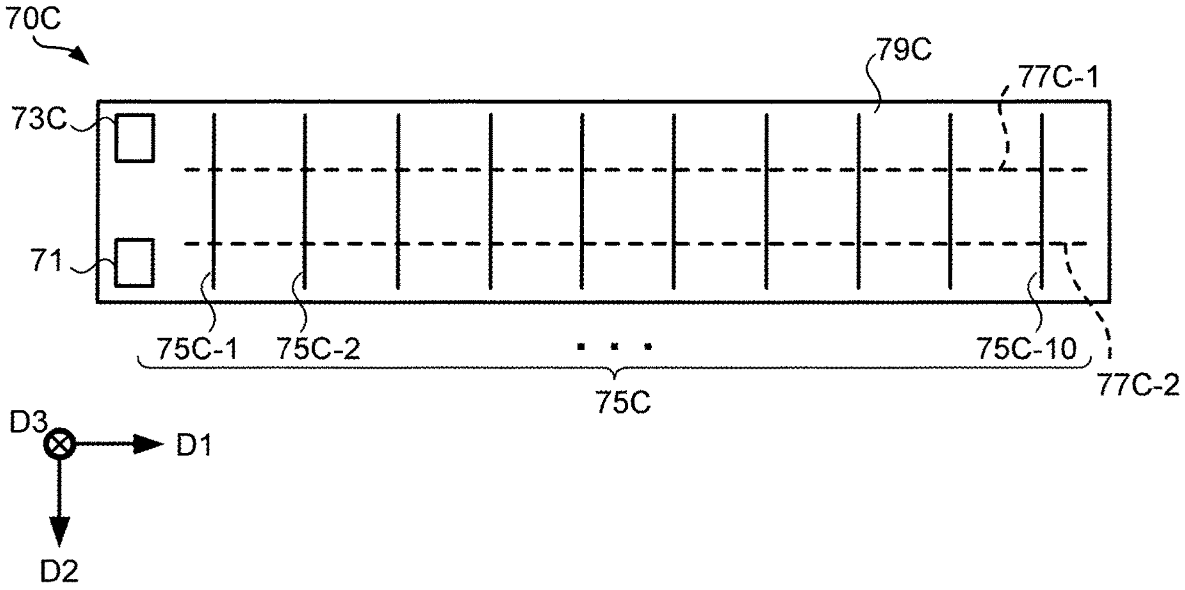
FIG. 13 is a diagram showing a positional relationship between a transmitting electrode and a receiving electrode in a fourth embodiment (in the case where a proximity sensor is viewed from an upper direction of a keyboard apparatus).

FIG. 13 is a diagram showing a positional relationship between the transmitting electrode and the receiving electrode in the fourth embodiment (in the case where the proximity sensor is viewed from above the keyboard apparatus). The proximity sensor 70C has the receiving electrode (first electrode) 77C-1 and the receiving electrode (fourth electrode) 77C-2 extending along the first direction and arranged side by side in the second direction D2 on a support substrate 79C. Each of the receiving electrodes 77C-1 and 77C-2 intersects the transmitting electrodes 75C (75C-1, 75C-2, . . . , and 75C-10). Detection units 73C-1 and 73C-2 corresponding to the receiving electrodes 77C-1 and 77C-2 are also arranged on the support substrate 79C. By arranging the receiving electrodes 77C-1 and 77C-2 in this way, a position of the object in the longitudinal direction of the key 80 can also be detected.

Figure 14:
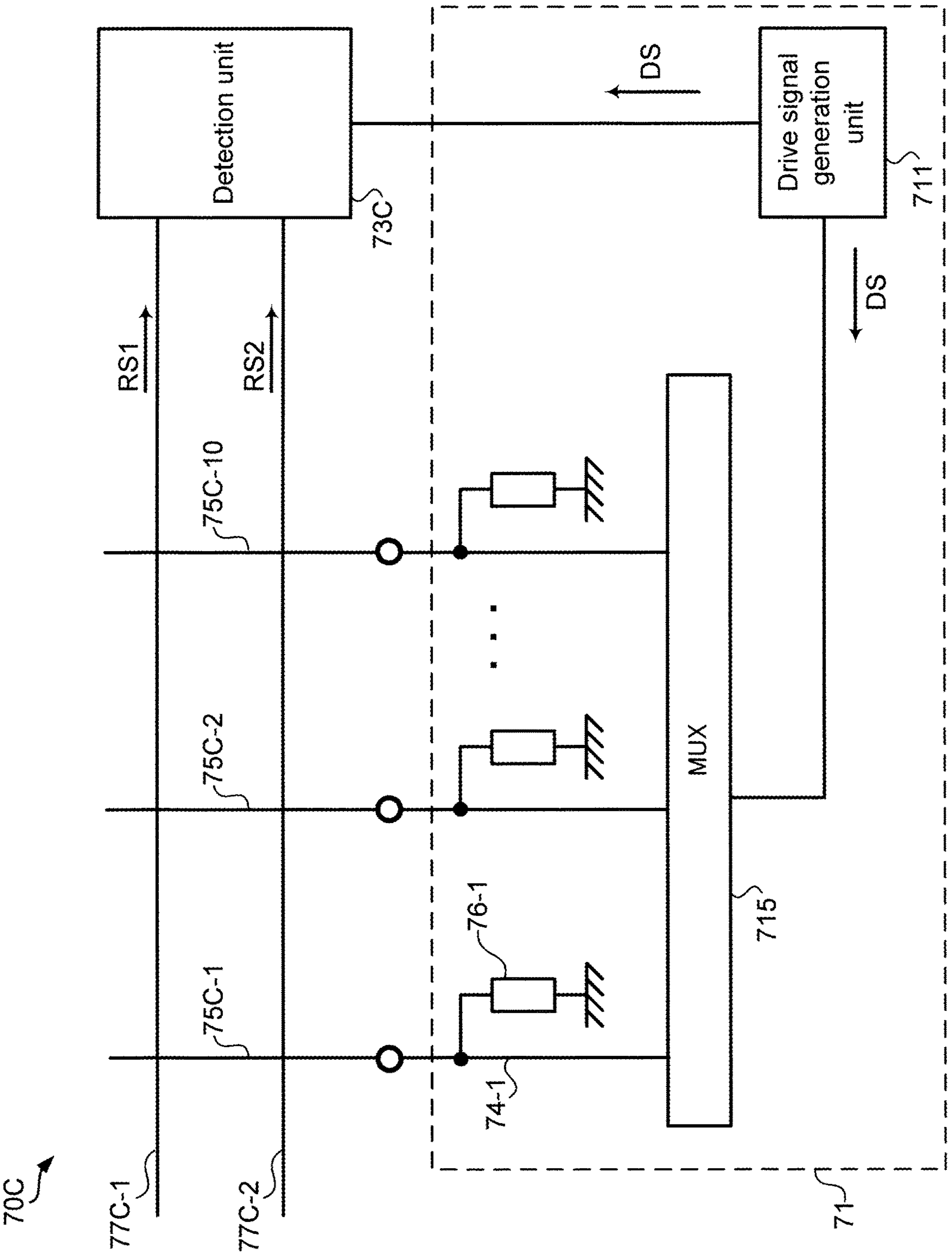
FIG. 14 is a diagram showing a configuration of the proximity sensor according to the fourth embodiment.

FIG. 14 is a diagram showing a configuration of a proximity sensor according to the fourth embodiment. As described above, the proximity sensor 70C includes two receiving electrodes 77C-1, 77C-2 and a detection unit 73C connected to the receiving electrodes 77C-1, 77C-2.

Figure 15:
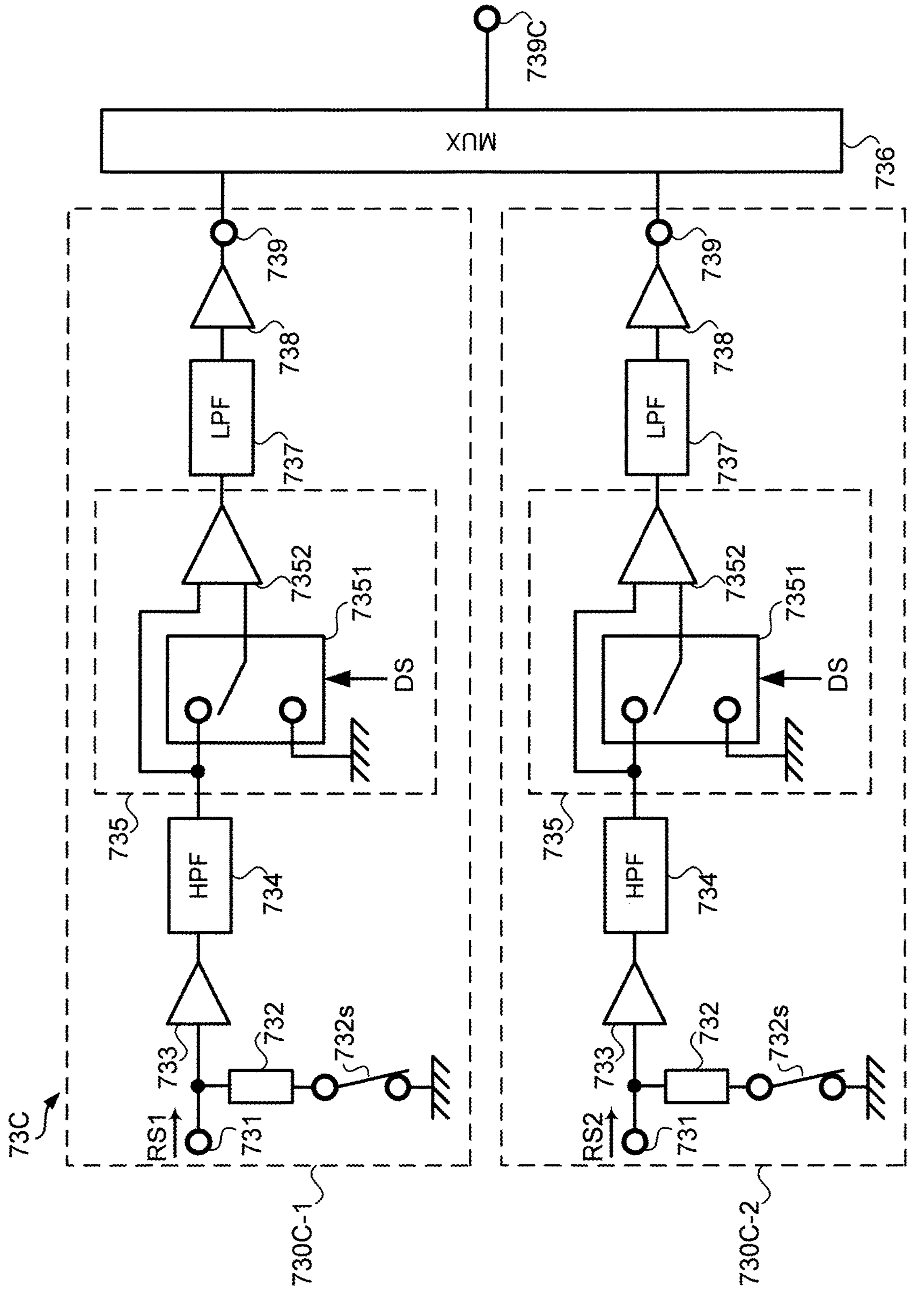
FIG. 15 is a diagram showing a configuration of a detection unit according to the fourth embodiment.

FIG. 15 is a diagram showing a configuration of a detection unit according to the fourth embodiment. The detection unit 73C includes detection blocks 730C-1 and 730C-2, a multiplexer 736, and an output terminal 739C. The detection block 730C-1 is supplied with a reception signal RS1 from the receiving electrode 77C-1, and the detection block 730C-2 is supplied with a reception signal RS2 from the receiving electrode 77C-2. The detection block 730C-1 and the detection block 730C-2 have the same configuration except that the reception signals input to the input terminals 731 are different from each other. The detection block 730C-1 further includes a switch 732*s* that is configured to disconnect the ground resistance 732 from the ground potential with respect to the detection unit 73 in the first embodiment.

The multiplexer 736 sequentially supplies an output signal of the detection block 730C-1 and an output signal of the detection block 730C-2 to the output terminal 739C by sequentially switching the detection block 730C-1 or the detection block 730C-2 and connecting them to the output terminal 739C. A period in which the respective output signals are supplied to the output terminal 739C may correspond to, for example, a first half and a second half of the period in which the drive signal DS is transmitted to one of the transmitting electrodes 75. The multiplexer 736 may switch the output signal to be supplied to the output terminal 739C each time the drive signal DS is supplied to all the transmitting electrodes 75. The proximity sensor 70C generates a detection signal PS based on a signal output from the output terminal 739C.

Similar to the third embodiment, the proximity sensor 70C may disable the receiving electrode 77C-1 or the receiving electrode 77C-2. In the case where neither the receiving electrode 77C-1 nor 77C-2 is disabled, the ground resistance 732 is grounded by turning the switch 732*s* into a conductive state. On the other hand, for example, in the case where the receiving electrode 77C-1 is disabled, the switch 732*s* of the detection block 730C-1 should be turned into the non-conductive state so that the multiplexer 736 does not connect the detection block 730C-1 to the output terminal 739C. Depending on an impedance of the amplifier 733, a switch may be provided immediately after the input terminal 731 to isolate the input terminal 731 from the ground resistance 732 and the amplifier 733 to float the receiving electrode 77C-1. In the case where the receiving electrode 77C-1 or the receiving electrode 77C-2 does not need to be disabled, there may be no switch 732*s* in the detection unit 73C.

Fifth Embodiment

Instead of providing two detection blocks 730C-1 and 730C-2 corresponding to a plurality of receiving electrodes 77C-1 and 77C-2 in the detection unit 73C as described in the fourth embodiment, a detection unit 73D in which at least a part of the configuration of the detection blocks 730C-1 and 730C-2 are shared will be described.

Figure 16:
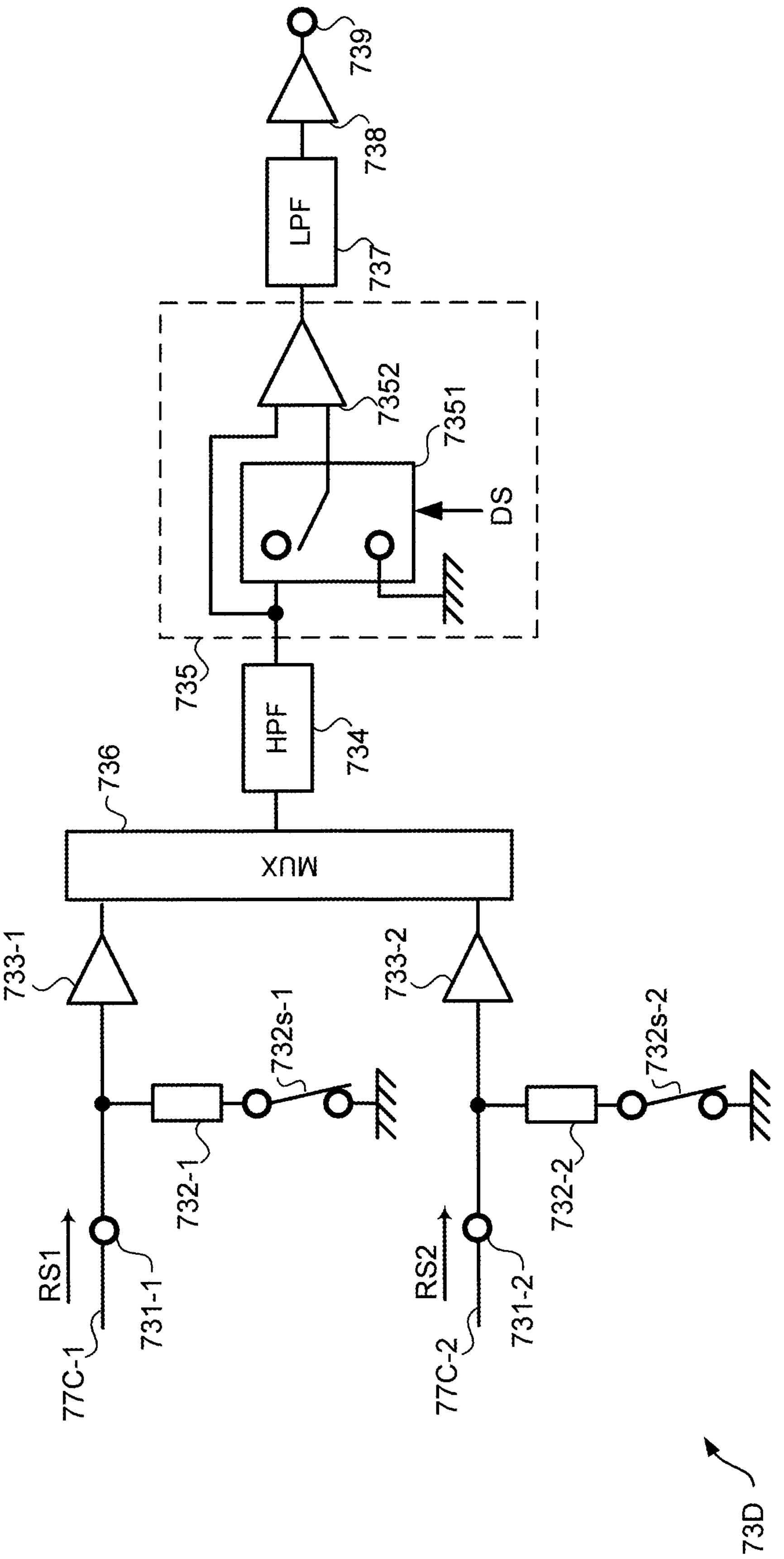
FIG. 16 is a diagram showing a configuration of a detection unit according to a fifth embodiment.

FIG. 16 is a diagram showing a configuration of a detection unit according to a fifth embodiment. As shown in FIG. 16, the configuration from the high pass filter 734 to the output terminal 739 supplied in the detection unit 73D is the same as that of the detection unit 73 in the first embodiment. On the other hand, configurations from the input terminal 731 to the amplifier 733 are provided corresponding to each of the plurality of receiving electrodes 77C-1 and 77C-2. For example, a ground resistance 732-1, a switch 732*s*-1, and an amplifier 733-1 are provided corresponding to the receiving electrode 77C-1. A ground resistance 732-2, a switch 732*s*-2, and an amplifier 733-2 are provided corresponding to the receiving electrode 77C-2.

The multiplexer 736 sequentially supplies an output signal of the amplifier 733-1 and an output signal of the amplifier 733-2 to the output terminal 739C by sequentially switching the amplifier 733-1 or the amplifier 733-2 and connecting them to the high pass filter 734. The period in which the respective output signals are supplied to the high pass filter 734 may correspond to, for example, a first half and a second half of the period in which the drive signal DS is transmitted to one of the transmitting electrodes 75. The multiplexer 736 may switch the output signal to be supplied to the high pass filter 734 each time the drive signal DS is supplied to all of the transmitting electrodes 75.

Similar to the third and fourth embodiments, the proximity sensor 70C may disable the receiving electrode 77C-1 or the receiving electrode 77C-2. In the case where neither the receiving electrode 77C-1 nor 77C-2 is disabled, the ground resistances 732-1 and 732-2 are grounded by turning the switches 732*s*-1 and 732*s*-2 into conductive states. On the other hand, for example, in the case where the receiving electrode 77C-1 is disabled, the switch 732*s*-1 should be turned into the non-conductive state so that the multiplexer 736 does not connect the amplifier 733-1 to the high pass filter 734. Depending on an impedance of the amplifier 733-1, a switch may be provided immediately after an input terminal 731-1 to isolate the input terminal 731-1 from the ground resistance 732-1 and the amplifier 733-1 to float the receiving electrode 77C-1. In the case where the receiving electrode 77C-1 or the receiving electrode 77C-2 does not need to be disabled, there may be no switch 732*s*-1 and no switch 732*s*-2 in the detection unit 73D.

Sixth Embodiment

In the fourth and fifth embodiments, the receiving electrode 77A is constituted by a plurality of electrodes in the proximity sensor 70A having the transmitting electrode 75A and the receiving electrode 77A crossing each other as described in the second embodiment. In the sixth embodiment, in a relationship between the transmitting electrode 75 and the receiving electrode 77 as described in the first embodiment, a proximity sensor 70E in which the receiving electrode 77 is composed of a plurality of electrodes will be described.

Figure 17:
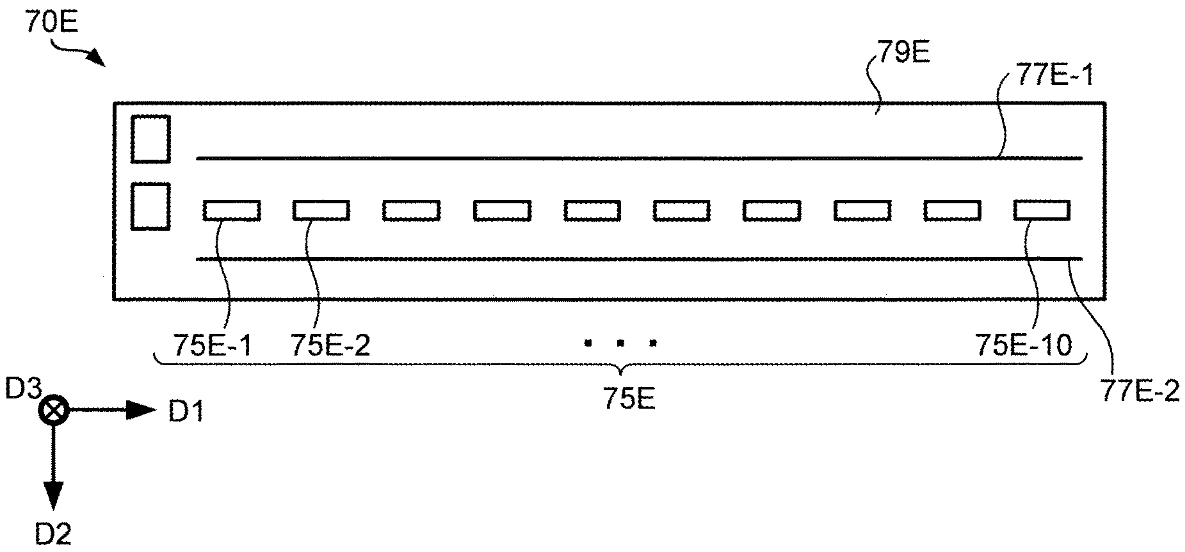
FIG. 17 is a diagram showing a positional relationship between a transmitting electrode and a receiving electrode in a sixth embodiment (in the case where a proximity sensor is viewed from an upper direction of a keyboard apparatus).

FIG. 17 is a diagram showing a positional relationship between the transmitting electrode and the receiving electrode in the sixth embodiment (in the case where the proximity sensor is viewed from the upper direction of the keyboard apparatus). As shown in FIG. 17, transmitting electrodes 75E (75E-1, 75E-2, . . . , and 75E-10) are arranged side by side in the first direction D1. The receiving electrodes 77E-1 and 77E-2 are electrodes extending along the first direction D1, and are arranged side by side in the second direction D2. The plurality of transmitting electrodes 75E are arranged between the receiving electrode 77E-1 and the receiving electrode 77E-2. Even in the case where the transmitting electrode 75 according to the first embodiment is assumed, the proximity sensor 70E including two receiving electrode 77E-1 and 77E-2 can be realized.

Seventh Embodiment

Although only a proximity sensor having a plurality of transmitting electrodes has been described in the above-described embodiment, the present invention is applicable to a proximity sensor having one transmitting electrode and a plurality of receiving electrodes. In a seventh embodiment, in the proximity sensor 70A according to the second embodiment, a proximity sensor 70F having a plurality of receiving electrodes 77F and one transmitting electrode 75F by replacing the transmitting electrode and the receiving electrode will be described.

Figure 18:
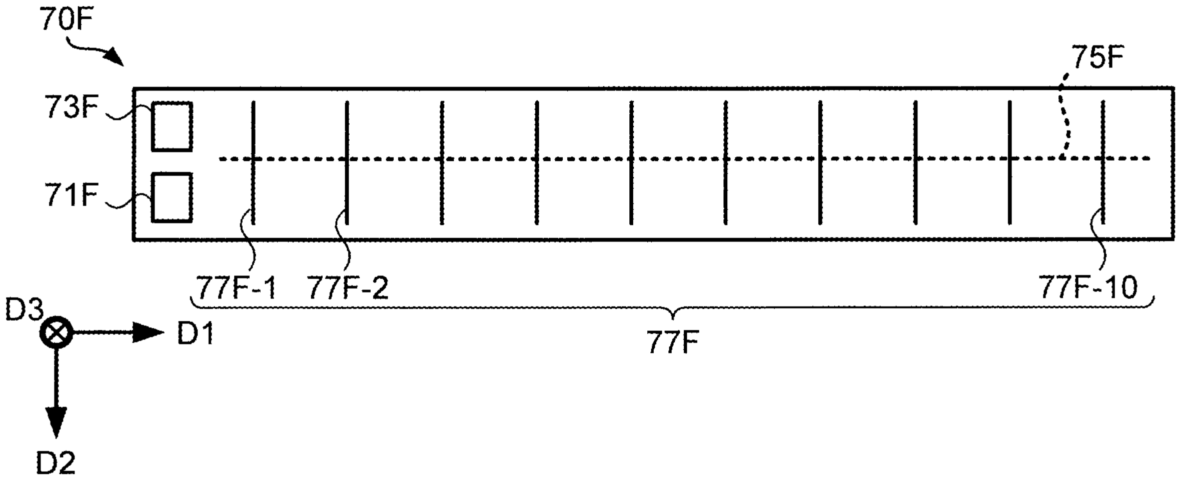
FIG. 18 is a diagram showing a positional relationship between a transmitting electrode and a receiving electrode in a seventh embodiment (in the case where a proximity sensor is viewed from an upper direction of a keyboard apparatus).

FIG. 18 is a diagram showing a positional relationship between the transmitting electrode and the receiving electrode in the seventh embodiment (in the case where the proximity sensor is viewed from the upper direction of the keyboard apparatus). The plurality of receiving electrodes 77F (77F-1, 77F-2, . . . , and 77F-10) extend along the second direction D2 and are arranged side by side in the first direction. The transmitting electrode 75F is one electrode that intersects the plurality of receiving electrodes 77F and extends along the first direction D1.

Figure 19:
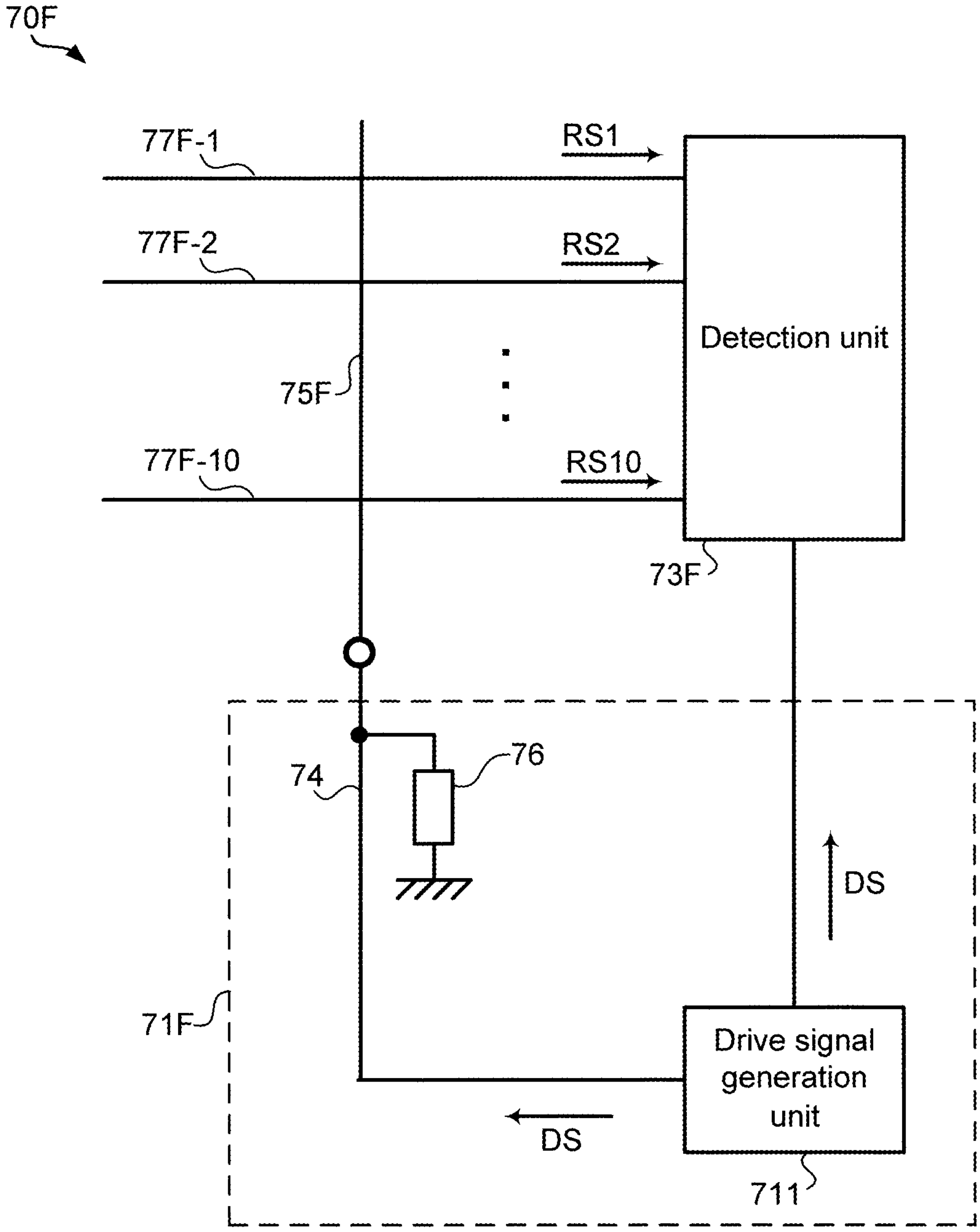
FIG. 19 is a diagram showing a configuration of the proximity sensor according to the seventh embodiment.

FIG. 19 is a diagram showing a configuration of a proximity sensor according to the seventh embodiment. The drive signal generation unit 711 supplies the drive signal DS to the transmitting electrode 75F. Since there is only one transmitting electrode, the multiplexer 715 is not necessary. Receiving signals RS1, RS2, . . . , and RS10 received by the receiving electrodes 77F-1, 77F-2, . . . , and 77F-10 are input to a detection unit 73F. The detection unit 73F may have a configuration in which the reception signal RS1 and the reception signal RS2 are processed in parallel, in the detection unit 73C according to the fourth embodiment or the detection unit 73D according to the fifth embodiment is extended to the RS1, RS2, . . . , and RS10.

<Modification>

Although an embodiment of the present disclosure has been described above, the embodiment of the present disclosure can be modified into various forms as follows. Further, the embodiments described above and modifications described below can be applied in combination with each other.

(1) The keyboard apparatus 1 in the embodiment described above is not limited to a case where one proximity sensor is provided, and may be configured to include a plurality of proximity sensors. The plurality of proximity sensors may be arranged side by side in the first direction D1 or may be arranged side by side in the second direction D2.

(2) The sound source control method in the embodiment described above is an example and can be used to control various sound sources. For example, in the case where an object moving from the bass range toward the treble range is detected based on the detection signal PS, the control unit 10 may initiate a glissando process on the sound source unit 30.

The glissando process is, for example, a process of generating sound at a pitch that changes from the bass range toward the treble range in accordance with a change in the position of an object even if the key 80 is not actually operated. Similarly, in a case where an object moving from the treble range toward the bass range is detected, a process of generating sound with a pitch that changes from the treble range toward the bass range may be started. As described above, the control unit 10 may control the sound source unit 30 to generate the sound signal by specifying a sound generation timing based on the detection result of the proximity sensor in addition to the operation to the key 80. That is, the control unit 10 may generate the sound source control signal Ct based on the detection signal PS. In the glissando process, a sound signal in which a signal level is controlled so as to increase the sound as the distance between the detected object and the key 80 becomes closer may be generated.

As another sound source control method, the control unit 10 may recognize a motion of an object immediately before operating the key 80 (for example, a speed approaching the key 80) based on the detection signal PS, and change a parameter for generating the sound signal according to the motion. This parameter may be, for example, a timbre or a parameter for determining an envelope, such as attack, decay, sustain, and release.

(3) The object to be controlled in accordance with the detection signal PS may not be the sound source unit 30. For example, in the case where the keyboard apparatus 1 includes a load unit 89 (see FIG. 5) that applies a reaction force to the key 80 by applying an electrical load with respect to an operation of the key 80, the detection signal PS may be used to control the reaction force. The load unit 89 is, for example, a mechanism that applies the reaction force to the key 80 using a solenoid. In this case, the control unit 10 may recognize the motion of the object immediately before the operation of the key 80 (for example, the speed of approaching the key 80), and control a magnitude of the load so as to change the reaction force applied to the key 80 around the object in accordance with the motion.

(4) In the embodiment describe above, as shown in FIG. 3, the receiving electrode 77 does not intersect with the transmitting electrode 75, and is not arranged in the area (area SA) connecting the plurality of transmitting electrodes 75. The receiving electrode 77 may be arranged in the area SA without intersecting the transmitting electrode 75. For example, the receiving electrode 77 shown in FIG. 3 may have an electrode extending in the area SA.

According to the present disclosure, it is possible to simplify the structure of the proximity sensor arranged in the keyboard apparatus.

What is claimed is:

1. A keyboard apparatus comprising:
a keyboard including a plurality of keys, including a first key and a second key, arranged along a first direction; and
a proximity sensor including:
a first electrode extending along the first direction from at least a first area below the first key to a second area below the second key;
a second electrode arranged in the first area; and
a third electrode arranged in the second area,
wherein the proximity sensor is a mutual capacitance type sensor and is configured to detect a change in capacitance between:
the first electrode and the second electrode; and
the first electrode and the third electrode.

2. The keyboard apparatus according to claim 1, wherein:
the keyboard includes a third key adjacent to the first key, and
the second electrode extends from the first area to a third area below the third key.

3. The keyboard apparatus according to claim 1, wherein:
the second electrode and the third electrode do not intersect the first electrode along a second direction, which is perpendicular to both a longitudinal direction of the first key and the first direction.

4. The keyboard apparatus according to claim 3, wherein:
the third electrode is adjacent to the second electrode, and
the second and third electrodes are spaced along the first direction.

5. The keyboard apparatus according to claim 1, wherein:
the second electrode and the third electrode each extend along a second direction that is perpendicular to the first direction, and
the second electrode and the third electrode intersect the first electrode.

6. The keyboard apparatus according to claim 1, further comprising:
a drive unit configured to supply a drive signal to the second electrode and the third electrode; and
a detection circuit configured to acquire a detection signal generated in the first electrode.

7. The keyboard apparatus according to claim 6, wherein:
the drive unit supplies the drive signal to the second electrode during a first period, and
the drive unit supplies the drive signal to the third electrode during a second period different from the first period.

8. The keyboard apparatus according to claim 1, further comprising:
a drive unit configured to supply a drive signal to the first electrode; and
a detection circuit configured to acquire a detection signal generated in the second electrode and the third electrode.

9. The keyboard apparatus according to claim 8, wherein:
the detection unit acquires the detection signal generated in the second electrode during a first period, and
the detection unit acquires the detection signal generated in the third electrode during a second period different from the first period.

10. The keyboard apparatus according to claim 1, wherein:

the second electrode and the third electrode are connected to a fixed potential via a resistor, and the proximity sensor further comprises a switching unit configured to switch connection or disconnection between the second electrode and the fixed potential.

11. The keyboard apparatus according to claim 1, wherein:

the proximity sensor further includes a fourth electrode, and the fourth electrode is spaced from the first electrode along a second direction, which extends along a longitudinal direction of the first key.

12. The keyboard apparatus according to claim 1, further comprising:

a sound source unit, including a signal processor, configured to generate a sound signal based on set parameters; and a processor configured to control the set parameters based on detection results detected by the proximity sensor.

13. The keyboard apparatus according to claim 12, wherein the sound source unit generates a sound signal of a timbre based on the set parameters in response to an operation on the keyboard.

14. The keyboard apparatus according to claim 13, wherein the set parameters include key range information configured to specify a first key range and a second key range among the keyboard.

15. The keyboard apparatus according to claim 12, wherein:

the set parameters include information for changing a signal level of the sound signal, and the sound source unit generates the sound signal at a timing based on the detection results.

16. The keyboard apparatus according to claim 1, further comprising:

a load unit configured to apply a load to the first key, in a state where the first key is pressed; and a processor configured to control a magnitude of the load applied by the load unit based on detection results detected by the proximity sensor.

17. A proximity sensor for a keyboard apparatus including a plurality of keys, including a first key and a second key, arranged along a first direction, the proximity sensor comprising:

a first electrode configured to extend along the first direction from at least a first area below the first key to a second area below the second key, in a state where the proximity sensor is installed in the keyboard apparatus;

a second electrode configured to be arranged in the first area, in the state where the proximity sensor is installed in the keyboard apparatus; and a third electrode configured to be arranged in the second area, in the state where the proximity sensor is installed in the keyboard apparatus, wherein the proximity sensor is a mutual capacitance type sensor and is configured to detect a change in capacitance between:

the first electrode and the second electrode; and the first electrode and the third electrode.

* * * * *